United States Patent
Moyer

(10) Patent No.: US 11,561,895 B2
(45) Date of Patent: Jan. 24, 2023

(54) OLDEST OPERATION WAIT TIME INDICATION INPUT INTO SET-DUELING

(71) Applicant: Advanced Micro Devices, Inc., Santa Clara, CA (US)

(72) Inventor: Paul James Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/562,101

(22) Filed: Sep. 5, 2019

(65) Prior Publication Data

US 2021/0073126 A1 Mar. 11, 2021

(51) Int. Cl.
 *G06F 12/0802* (2016.01)

(52) U.S. Cl.
 CPC .. *G06F 12/0802* (2013.01); *G06F 2212/6046* (2013.01)

(58) Field of Classification Search
 CPC ............ G06F 12/0802; G06F 2212/6046
 See application file for complete search history.

(56) References Cited

U.S. PATENT DOCUMENTS

| | | | |
|---|---|---|---|
| 6,349,365 B1 | 2/2002 | McBride | |
| 6,823,427 B1 | 11/2004 | Sander et al. | |
| 7,861,041 B2 | 12/2010 | Williams | |
| 2004/0216001 A1* | 10/2004 | Kalla | G06F 9/3861 |
| | | | 714/5.11 |
| 2008/0005479 A1* | 1/2008 | Tremaine | G06F 13/1673 |
| | | | 711/137 |
| 2010/0122035 A1* | 5/2010 | Strumpen | G06F 12/123 |
| | | | 711/136 |
| 2010/0153928 A1* | 6/2010 | Livshits | G06F 11/3461 |
| | | | 717/132 |
| 2010/0281216 A1 | 11/2010 | Patel et al. | |
| 2014/0173248 A1* | 6/2014 | Varma | G06F 9/3885 |
| | | | 712/30 |
| 2017/0315932 A1* | 11/2017 | Moyer | G06F 12/123 |
| 2017/0357588 A1 | 12/2017 | Moyer | |

(Continued)

OTHER PUBLICATIONS

International Search Report and Written Opinion in International Application No. PCT/US2020/049197, dated Dec. 17, 2020, 10 pages.

*Primary Examiner* — David Yi
*Assistant Examiner* — Nicholas A. Paperno
(74) *Attorney, Agent, or Firm* — Kowert Hood Munyon Rankin and Goetzel PC; Rory D. Rankin

(57) ABSTRACT

Systems, apparatuses, and methods for dynamically adjusting cache policies to reduce execution core wait time are disclosed. A processor includes a cache subsystem. The cache subsystem includes one or more cache levels and one or more cache controllers. A cache controller partitions a cache level into two test portions and a remainder portion. The cache controller applies a first policy to the first test portion and applies a second policy to the second test portion. The cache controller determines the amount of time the execution core spends waiting on accesses to the first and second test portions. If the measured wait time is less for the first test portion than for the second test portion, then the cache controller applies the first policy to the remainder portion. Otherwise, the cache controller applies the second policy to the remainder portion.

20 Claims, 6 Drawing Sheets

(56) References Cited

U.S. PATENT DOCUMENTS

2018/0024931 A1* 1/2018 Moyer .................. G06F 12/127
                                                        711/137
2019/0082033 A1* 3/2019 Tak ....................... H04L 41/085

* cited by examiner

OLDEST OPERATION WAIT TIME INDICATION INPUT INTO SET-DUELING

BACKGROUND

Description of the Related Art

Most modern computing devices provide at least one level of cache memory (or cache) in addition to a main memory in the computing device. Generally, caches are smaller-capacity, faster-access memories that are used for storing a limited number of copies of data and instructions to be used for performing various operations nearer to the functional blocks in the computing device that perform the operations. Caches are typically implemented using higher-speed memory circuits, such as static random access memory (SRAM) integrated circuits or other types of memory circuits. When a processor requests access to data stored in memory, the processor first determines whether a copy of the data is stored in the cache. If so, the processor accesses the cache, facilitating a more efficient accessing of the data.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF IMPLEMENTATIONS

Figure 1:
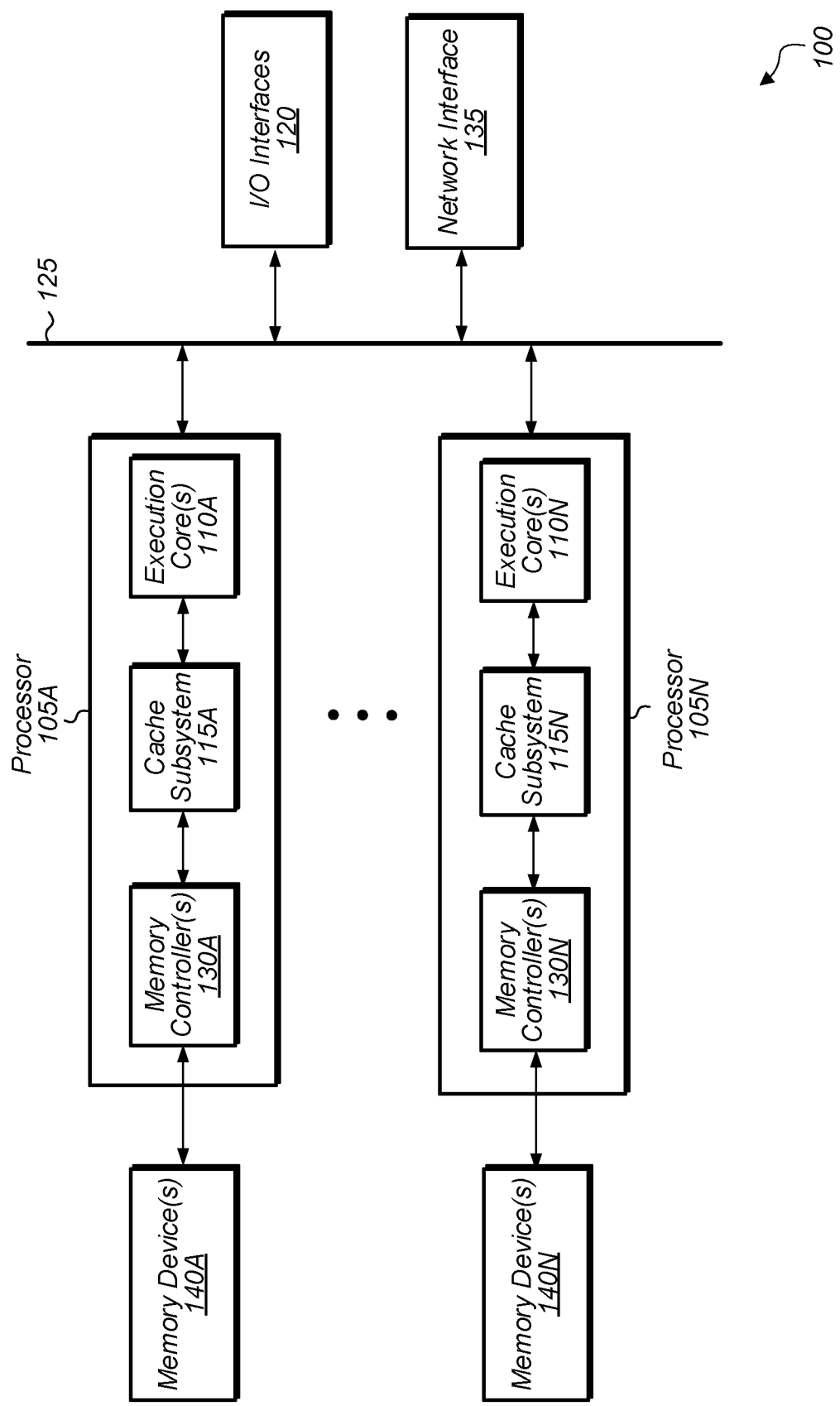
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for dynamically adjusting cache policies to reduce execution core wait time are disclosed herein. In one implementation, a processor includes at least an execution core and a cache subsystem. The cache subsystem includes one or more cache levels and one or more cache controllers. A cache controller partitions a cache level into three portions including two test portions and a third portion different from the two test portions. The cache controller applies a first policy to the first test portion while applying a second policy to the second test portion. Each of the first and second policies specifies behaviors and attributes such as cache line replacement and insertion policies, request priority, speculation hints, pre-emptive response generation, and so on. For example, the pre-emptive response generation policy specifies whether the cache should pre-emptively send a response before it knows cache hit/miss status or DRAM page open/close status. The cache controller also determines the amount of time that the execution core spends waiting on accesses to the first and second test portions. In various embodiments, the cache controller itself monitors and/or measures this amount of time. In other embodiments, another component monitors and/or measures this amount of time and the cache controller accesses the monitored and/or measured amount of time (e.g., stored in a memory location, register, etc.). Various such embodiments are possible and are contemplated. If the measured wait time is less for the first test portion than for the second test portion, then the cache controller applies the first policy to the third portion. Otherwise, if the measured wait time is less for the second test portion than for the first test portion, then the cache controller applies the second policy to the third portion. In some implementations, the third portion represents the remainder of the cache (i.e., all remaining portions of the cache) and in some implementations the third portion represents less than the remainder of the cache. While the following description often refers to the remainder of the cache for ease of discussion, it is to be understood that all or less than all remaining portions are contemplated depending on the embodiment.

Referring now to FIG. 1, a block diagram of one implementation of a computing system 100 is shown. In one implementation, computing system 100 includes at least processors 105A-N, input/output (I/O) interfaces 120, bus 125, memory controller(s) 130A-N, network interface 135, and memory device(s) 140A-N. In other implementations, computing system 100 includes other components (e.g., display controller) and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In one implementation, processor 105A includes at least execution core(s) 110A, cache subsystem 115A, and memory controller(s) 130A. Similarly, processor 105N includes at least execution core(s) 110N, cache subsystem 115N, and memory controller(s) 130N. It is noted that execution core(s) 110A-N can also be referred to herein as execution units. It is also noted that processors 105A-N can include other components which are not shown to avoid obscuring the figure.

In one implementation, cache subsystems 115A-N include control logic for monitoring the amount of time that execution core(s) 110A-N, respectively, spend waiting on cache accesses. In one implementation, the control logic applies different policies to different portions of a given cache level. Also in this implementation, the control logic tracks the amount of time that the execution core(s) spend waiting for accesses to two separate portions of a given cache level. If the amount of time spent waiting for a first cache portion is less than the amount of time spent waiting for a second cache portion, then the control logic takes the policy which was applied to the first cache portion and applies this policy to the remainder (a third portion different from the first and second portions) of the given cache level. Otherwise, if the amount of time spent waiting for the second cache portion is less than the amount of time spent waiting for the first cache portion, then the control logic takes the policy which was applied to the second cache portion and applies this policy to the remainder of the given cache level. In other implementations, the control logic monitors other numbers of portions of the given cache level while applying different policies to these portions.

Memory controller(s) 130A-N are representative of any number and type of memory controllers which are coupled to any number and type of memory devices(s) 140A-N, respectively. While memory controller(s) 130A-N are shown as being located within processors 105A-N, respectively, this is merely indicative of one implementation.

In another implementations, memory controller(s) 130A-N are external to processors 105A-N, respectively. It is also noted that a portion of cache subsystems 115A-N can be located within execution core(s) 110A-N, respectively, and another portion of cache subsystems 115A-N can be located external to execution core(s) 110A-N. For example, in one implementation, a level one (L1) cache and a level two (L2) cache are located within execution core(s) 110A-N while a last level cache (LLC) is located external to execution core(s) 110A-N.

Memory device(s) 140A-N are representative of any number and type of memory devices. For example, the type of memory in memory device(s) 140A-N includes Dynamic Random Access Memory (DRAM), Static Random Access Memory (SRAM), NAND Flash memory, NOR flash memory, Ferroelectric Random Access Memory (FeRAIVI), or others. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation.

For example, there can be more or fewer of each component than the number shown in FIG. 1. It is also noted that computing system 100 can include other components not shown in FIG. 1. Additionally, in other implementations, computing system 100 can be structured in other ways than shown in FIG. 1.

Figure 2:
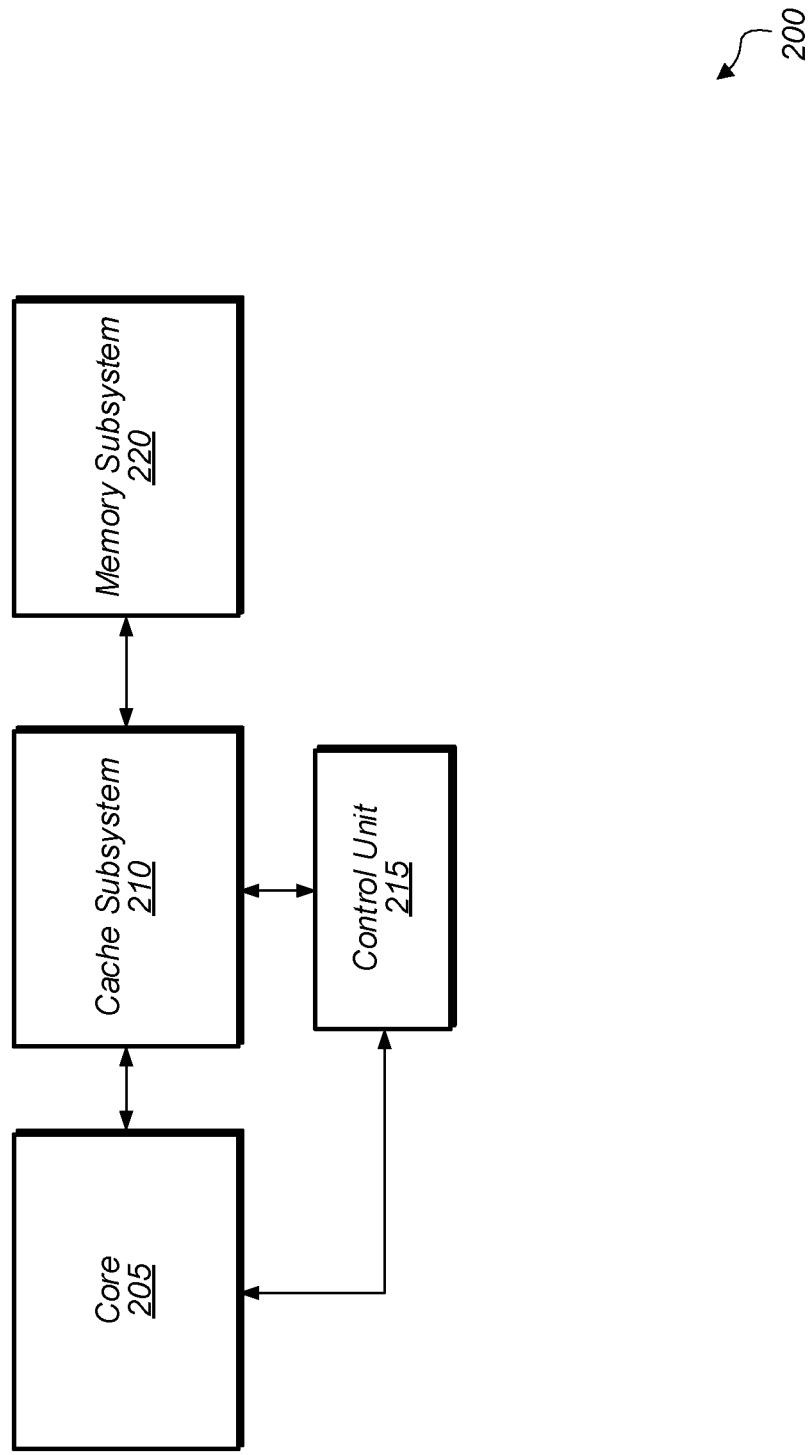
FIG. 2 is a block diagram of one implementation of a processor.

Turning now to FIG. 2, a block diagram of one implementation of a processor 200 is shown. In one implementation, processor 200 includes at least execution core 205, cache subsystem 210, control unit 215, and memory subsystem 220. It is noted that processor 200 can also include other components which are not shown to avoid obscuring the figure. Core 205 is representative of any number of processor cores for executing instructions of one or more programs and/or an operating system. In one implementation, the circuitry of processor 200 is included in processor 105A and/or processor 105N (of FIG. 1).

In one implementation, core 205 continuously transmits, to control unit 215, a physical address (or some other subset of identifiable information, such as cache index) of the oldest waiting cache access. For example, in one implementation, the instruction cache or data cache sends, to control unit 215, the oldest pending address of an access to a level-two (L2) cache of cache subsystem 210. In one implementation, a valid bit is also transmitted to indicate that core 205 is waiting on this operation in the performance critical-path. Control unit 215 monitors the IDs of these instructions, and control unit 215 splits the IDs of these instructions into two or more buckets. Control unit 215 applies different policies to these buckets, such as cache replacement/insertion policies, request priority throughout memory subsystem 220, hints on speculation such as should a pre-emptive response be sent before the cache hit/miss status or DRAM page open/close status is known, and the like. Control unit 215 counts the number of cycles that the instructions of a given bucket spend waiting on cache subsystem 210, and control unit 215 uses the counts to determine a performance-optimal policy. It is noted that while control unit 215 is shown as being separate from cache subsystem 210, in other implementations, control unit 215 integrated within cache subsystem 210.

The policies assigned to the different buckets affect a variety of settings for cache subsystem 210. For example, in one implementation, there is an age associated with every cache line in the index, with the age being relative to other cache lines in that index. That age can be set to various values when the corresponding cache line is accessed or when a different cache line is accessed. Or the age is adjusted when various operations are performed to the same index. Different policies can adjust these settings in different ways. For example, a line can be inserted into the cache and assigned a middle age in a first policy, while in a second policy, a line is inserted as the youngest age. In a third policy, the line might not be inserted in the cache, and the line might be inserted in the next level of cache instead. For example, in one implementation, the line is not allocated in the L2 cache, but the line will be allocated in the level three (L3) cache. The different policies can adjust these settings as well as other settings and parameters associated with the cache, portions of the cache, cache lines, and so on.

In one implementation, a given level of cache subsystem 210 is partitioned into a first portion, a second portion, and a remainder portion. The first portion corresponds to a first subset of cache indexes, the second portion corresponds to a second subset of cache indexes, and the remainder corresponds to all other cache indexes that are not in either the first subset or second subset. In one implementation, the first and second portions are smaller than the remainder portion. In one implementation, control unit 215 applies a first policy to the first portion and a second policy to the second portion. Control unit 215 monitors the wait time of instructions that access cache indexes in the first portion and the second portion. For example, control unit 215 calculates a first aggregate wait time for the first portion of cache subsystem 210. Also, control unit 215 calculates a second aggregate wait time for the second portion of cache subsystem 210. If the first aggregate wait time is less than the second aggregate wait time, then control unit 215 applies the first policy to the remainder portion of cache subsystem 210. Otherwise, if the second aggregate wait time is less than the first aggregate wait time, then control unit 215 applies the second policy to the remainder portion of cache subsystem 210. By tracking the wait time as opposed to tracking cache hit/miss measurements, control unit 215 is better able to determine which behaviors are impacting performance. This results in a more performance-optimal policy being applied to the remainder of cache subsystem 210 than is possible with traditional approaches.

Figure 3:
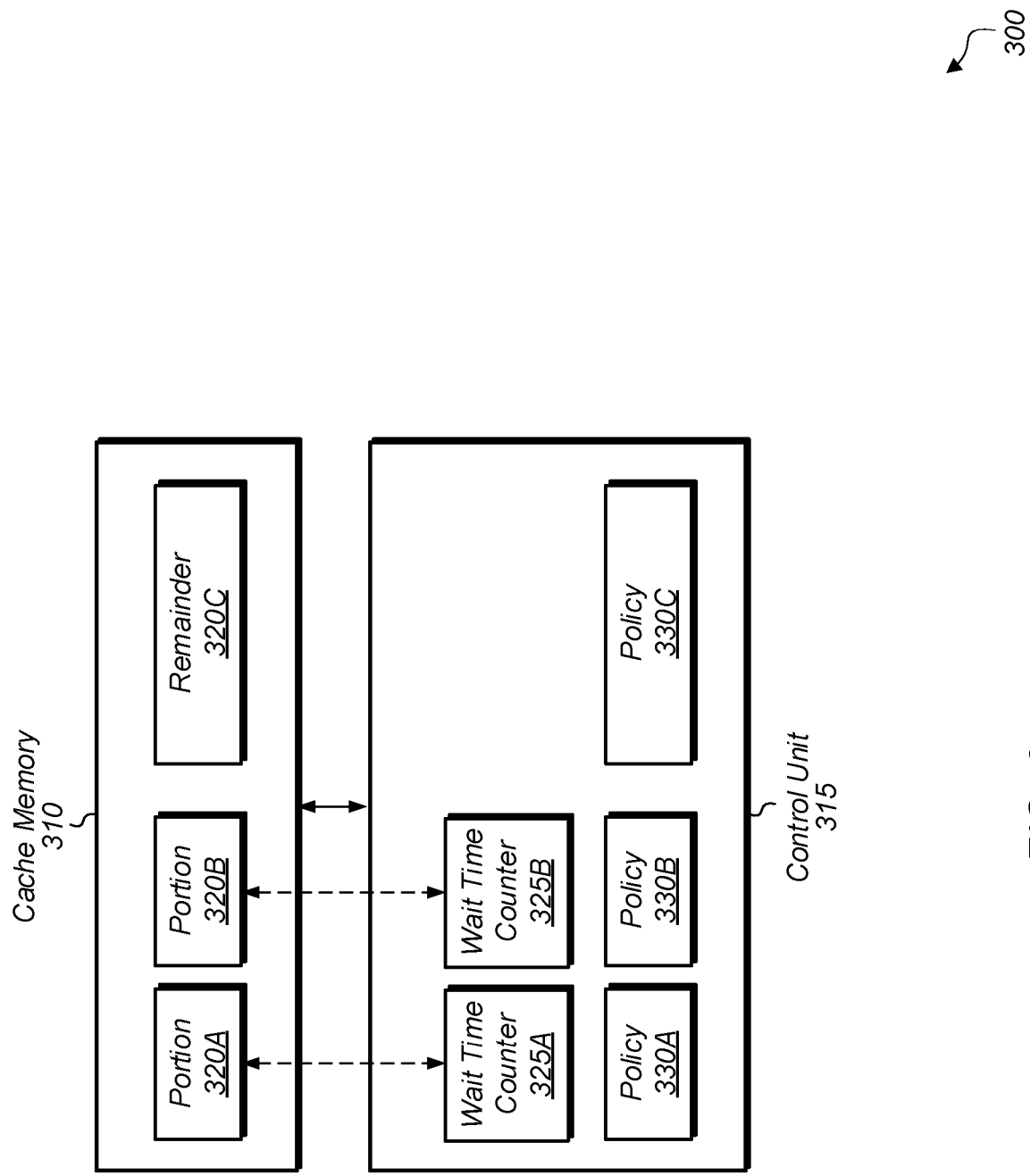
FIG. 3 is a block diagram of one implementation of determining a performance-optimal policy for a cache.

Referring now to FIG. 3, a block diagram of one implementation of determining a performance-optimal policy for a cache 300 for shown. Cache 300 is representative of any level of cache in a cache hierarchy (e.g., cache subsystem 210 of FIG. 2). Cache 300 includes at least cache memory 310 and control unit 315. In one implementation, cache memory 310 is partitioned into portion 320A, portion 320B, and remainder 320C. For example, in one implementation, portion 320A includes a first subset of cache indexes, portion 320B includes a second subset of cache indexes, and remainder 320C includes all remaining cache indexes that are not in the first subset or second subset. In another implementation, portion 320A includes a first subset of cache indexes, portion 320B includes a second subset of cache indexes, and remainder 320C includes cache indexes that are not in the first subset or second subset—but not all remaining cache indexes. Control unit 315 applies policy 330A to portion 320A, and control unit 315 applies policy 330B to portion 320B. It is assumed for the purposes of this discussion that policy 330A is different from policy 330B.

Depending on the implementation, policy 330A and policy 330B specify different types of behaviors and/or rules to their corresponding portions 330A and 330B, respectively. For example, policy 330A and 330B specify one or more of replacement policy, insertion policy, request priority, speculation hints, bypass decisions, and the like. Control unit 315 counts the number of cycles that a given portion has associated processor core wait time. For example, in one implementation, wait time counter 325A counts the number of cycles that requests corresponding to cache indexes in portion 320A spend waiting for a response from cache 300, and wait time counter 325B counts the number of cycles that requests corresponding to cache indexes in portion 320B spend waiting for a response from cache 300. In one implementation, control unit 315 monitors the values of wait time counter 325A and wait time counter 325B, and the counter with the lower value is considered to have the more performance-optimal policy. This more performance-optimal policy is then applied to remainder 320C. For example, after a given testing interval has elapsed, if wait-time counter 325A is less than wait-time counter 325B, then cache memory 310 applies policy 330A to the cache indexes of remainder 320C. Otherwise, if wait-time counter 325B is less than wait-time counter 325A after the given testing interval has expired, then cache memory 310 applies policy 330B to the cache indexes of remainder 320C. If wait-time counter 325B is equal to wait-time counter 325A, then control unit 315 extends the testing interval and then checks the values of counters 325A-B after the additional amount of time. Alternatively, instead of extending the testing interval, in some embodiments the control unit 315 simply selects one of the policies for application to the remainder 320C.

In one implementation, control unit 315 resets wait time counters 325A-B on a given schedule and then control unit 315 runs the monitoring test again. In one implementation, control unit 315 uses the same policies 330A-B that were previously tested, while in another implementation, control unit 315 changes one or both of policies 330A-B for the new test. It is noted that the example of having two separate portions 320A-B and two corresponding policies 330A-B is merely indicative of one implementation. In other implementations, cache memory 310 is partitioned into other numbers of portions, with each portion having its own policy. Control unit 315 then selects the best policy to apply to remainder 320C from these three or more policies based on which portion has the lowest wait time counter.

Figure 4:
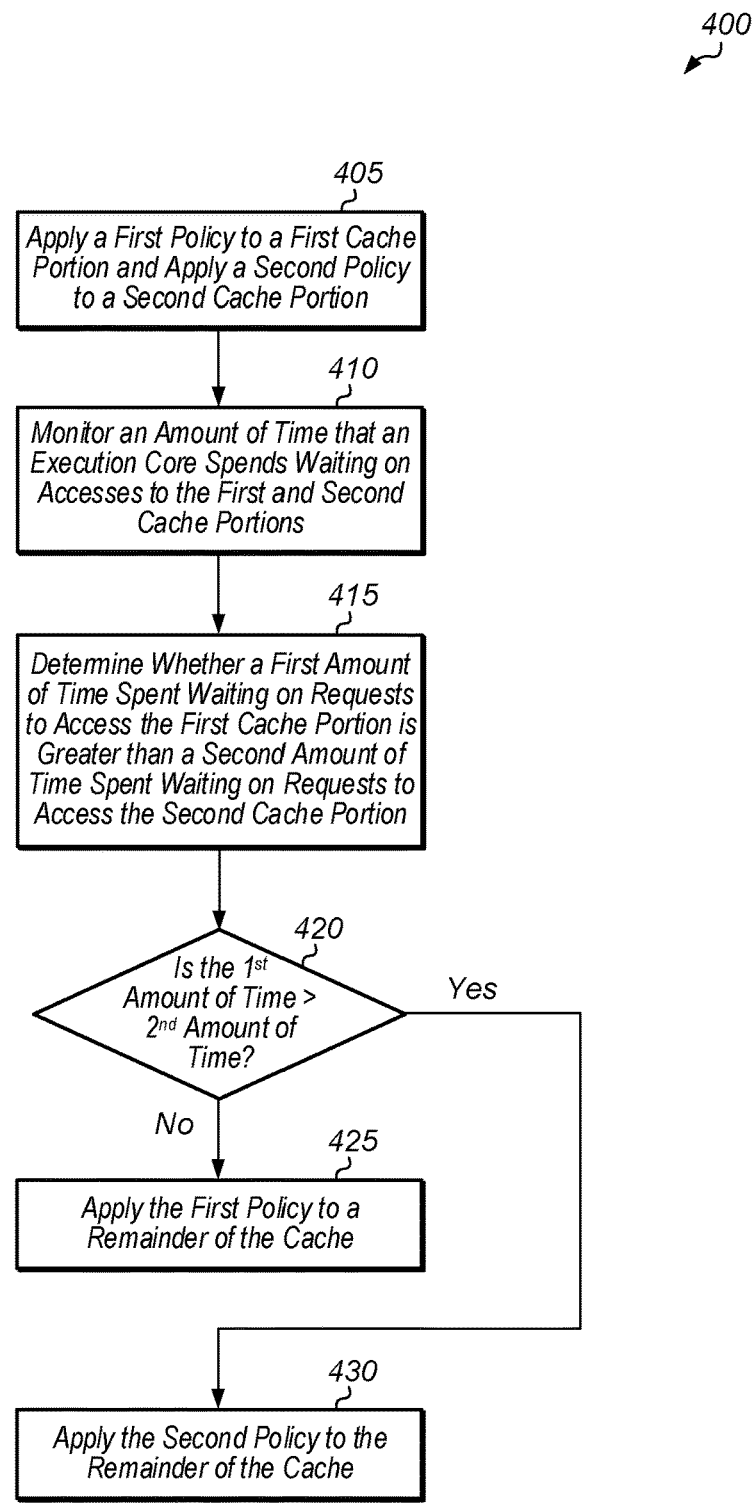
FIG. 4 is a generalized flow diagram illustrating one implementation of a method for determining a performance-optimal policy for a cache.
Figure 5:
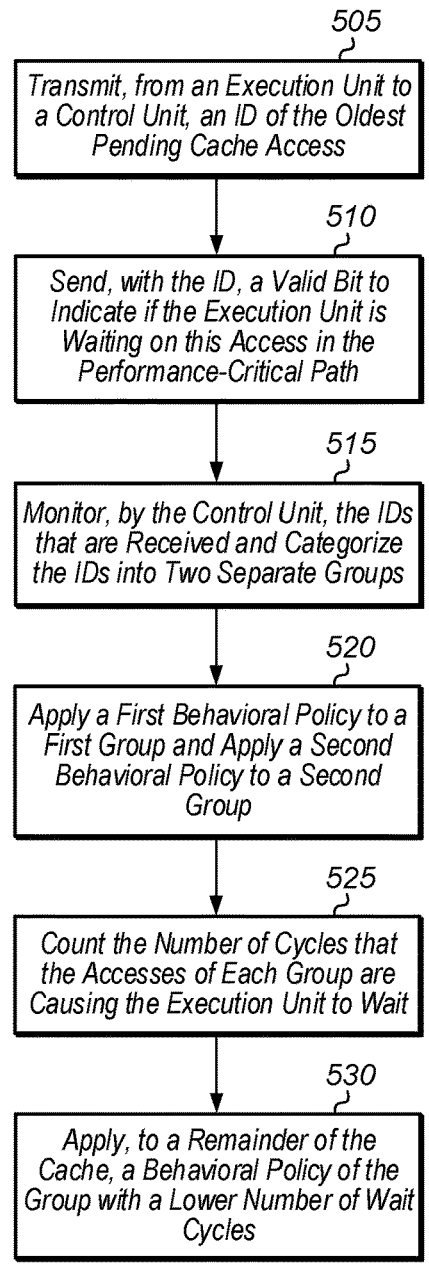
FIG. 5 is a generalized flow diagram illustrating one implementation of a method for monitoring oldest pending cache accesses.
Figure 6:
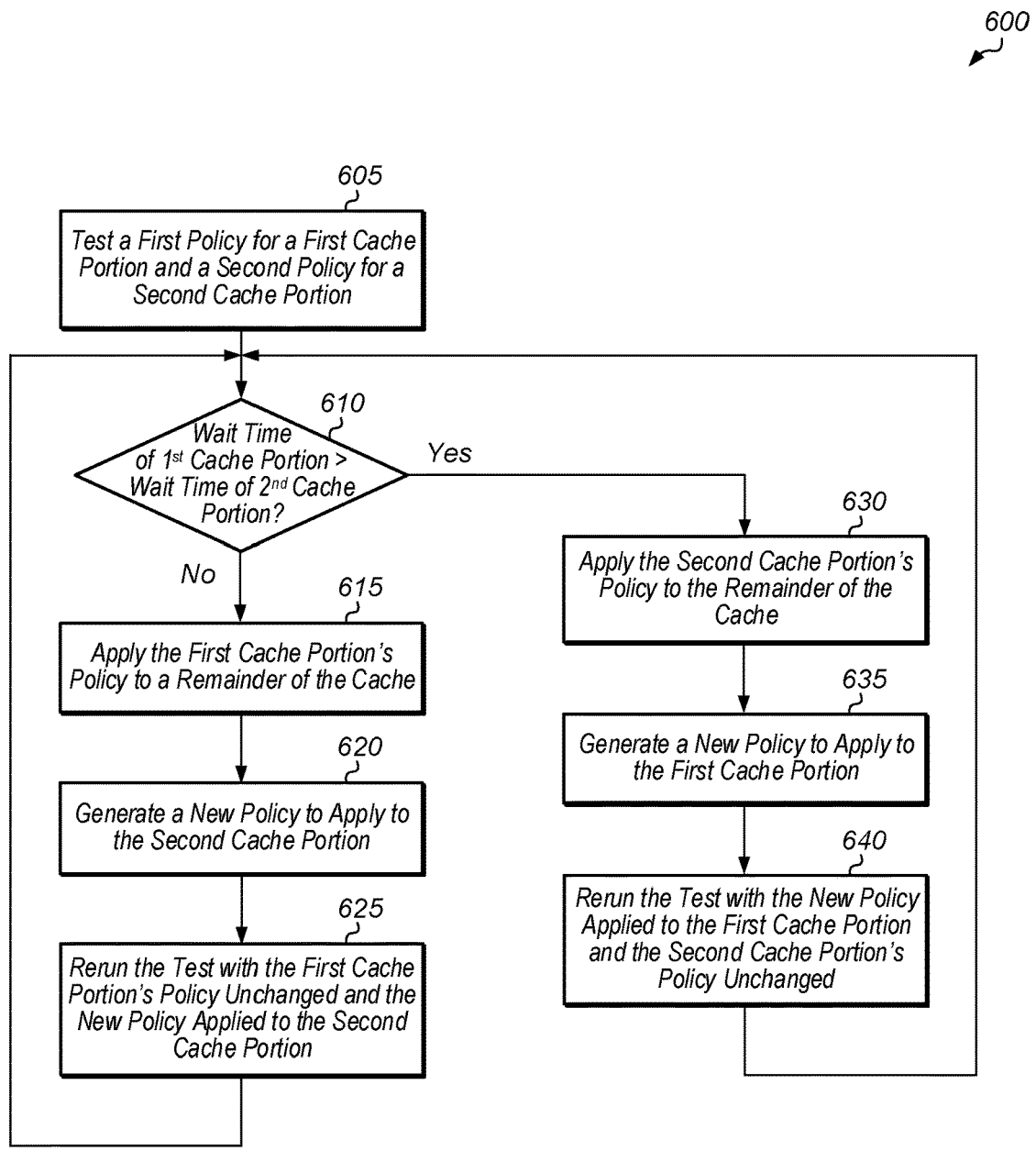
FIG. 6 is a generalized flow diagram illustrating one implementation of a method for dynamically tuning a cache policy to improve performance.

Turning now to FIG. 4, one implementation of a method 400 for determining a performance-optimal policy for a cache is shown. For purposes of discussion, the steps in this implementation and those of FIGS. 5-6 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 400.

A cache controller applies a first policy to a first cache portion, and the cache controller applies a second policy to a second cache portion (block 405). It is assumed for the purpose of this discussion that the second policy is different from the first policy. Each of the first policy and the second policy specify various types of settings and behaviors that are followed for the corresponding cache portion. The policies specify behaviors such as cache replacement/insertion policies, request priority throughout the memory subsystem, hints on speculation such as should a response be sent pre-emptively before the cache hit/miss status or DRAM page open/close status is known, and the like. For example, in one implementation, there is an age associated with every cache line at a given index, with the age being relative to other cache lines at the given index. Different policies can stipulate which value the age is set to when the corresponding cache line is accessed or when a different cache line at the same index is accessed. In one scenario, when a line is inserted the line is set to a middle age in a first policy, while in a second policy the line is set to a youngest age when the line is inserted. In this scenario, a third policy could specify that the line should not be inserted in the cache but rather the line should be inserted in the next level of cache instead.

Also, the cache controller monitors an amount of time that an execution core spends waiting on accesses to the first and second cache portions (block 410). In one implementation, the cache controller monitors the time from when the core issues a request to the time the request is serviced (e.g., when the core receives a response from the cache). For example, in one implementation, a first point in time is recorded when the core issues a request to the cache. Next, a second point in time is recorded when the core receives a response from the cache. Then, the difference between the second point in time and the first point in time is calculated and used as a measurement of the amount of time in block 410. In one implementation, this difference is measured based on the number of clock cycles that have elapsed between the first point in time and the second point in time.

After a given testing interval has elapsed, the cache controller determines whether a first amount of time that the execution core spends waiting on requests to access the first cache portion is greater than a second amount of time that the execution core spends waiting on requests to access the second cache portion (block 415). In one implementation, the first amount of time is an average amount of time per access that the execution core spends waiting on the first cache portion. In this implementation, the second amount of time is an average amount of time per access that the execution core spends waiting on the second cache portion.

If the first amount of time is greater than the second amount of time (conditional block 420, "yes" leg), then the cache controller applies the second policy to the remainder of the cache (block 430). Otherwise, if the first amount of time is less than the second amount of time (conditional block 420, "yes" leg), then the cache controller applies the first policy to the remainder of the cache (block 430). After blocks 425 and 430, method 400 ends. In cases where the first amount of time is equal to the second amount of time, the cache controller can extend the testing interval. Alternatively, the cache controller can change either the first policy or the second policy and rerun the test.

Referring now to FIG. 5, one implementation of a method 500 for monitoring oldest pending cache accesses is shown. An execution unit transmits, to a control unit, an identifier (ID) of the oldest pending cache access (block 505). For example, in one implementation, the instruction cache or data cache of the execution unit sends an ID of the oldest pending address to a L2 cache. The ID can be a physical address, virtual address, cache index, or some other attribute of the access. The execution unit also sends a valid bit, with the ID, to indicate if the core is waiting on this access in the performance-critical path (block 510).

The control unit monitors the IDs that are received and categorizes the IDs into two separate groups (block 515). In some cases, the control unit groups the IDs into more than two separate groups. The control unit applies a first behavioral policy to a first group and the control unit applies a second behavioral policy to a second group (block 520). Then, the control unit counts the number of cycles that the accesses of each group are causing the execution unit to wait (block 525). Next, the control unit applies, to a remainder of the cache, a behavioral policy of the group with a lower number of wait cycles (block 530). After block 530, method 500 ends.

Turning now to FIG. 6, one implementation of a method 600 for dynamically tuning a cache policy to improve performance is shown. A control unit tests a first policy for a first cache portion and a second policy for a second cache portion (block 605). The duration of the testing period can vary according to the implementation. If the wait time associated with the first cache portion is greater than the wait time associated with the second cache portion (conditional block 610, "yes" leg), then the control unit applies the second cache portion's policy to a remainder of the cache (block 630). Also, the control unit generates a new (third) policy to apply to the second cache portion (block 620) that is different from the second policy. In one implementation, one or more of the attributes that are chosen for the new policy are randomly generated. In another implementation, one or more of the attributes are set to values which are predicted to increase performance of a corresponding execution unit. Then, the control unit reruns the test with the previous policy applied to the first cache portion and the new policy applied to the second cache portion (block 625). After block 625, method 600 returns to conditional block 610.

If the wait time associated with the first cache portion is not greater than the wait time associated with the second cache portion (conditional block 610, "no" leg), then the control unit applies the first cache portion's policy to the remainder of the cache (block 615). Also, the control unit generates a new policy to apply to the first cache portion (block 635). Then, the control unit reruns the test with the new policy applied to the first cache portion and the second cache portion's policy unchanged (block 640). After block 640, method 600 returns to conditional block 610. By using method 600, the control unit is able to dynamically adjust policy during run-time to achieve greater performance. Rather than using a fixed policy or a predetermined policy, the policy is able to adapt to operating conditions of the host computing system.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A cache subsystem comprising:
   a cache; and
   a cache controller coupled to the cache, wherein the cache controller is configured to:
      receive, from an execution core, a plurality of identifiers corresponding to pending cache accesses that are relatively old compared to other pending cache accesses;
      split the plurality of identifiers into a first bucket of identifiers and a second bucket of identifiers;
      apply a first policy to the first bucket of identifiers and apply a second policy different from the first policy to the second bucket of identifiers;
      partition the cache into a first cache portion corresponding to the first bucket of identifiers and a second cache portion corresponding to the second bucket of identifiers;
      monitor a first amount of time that the execution core spends waiting on instructions to access the first cache portion; and
      apply the first policy to a third cache portion of the cache, responsive to a condition is satisfied.

2. The cache subsystem as recited in claim 1, wherein the first policy specifies one or more of a cache line replacement policy, cache line insertion policy, request priority, speculation hint generation, or pre-emptive response generation for the first cache portion.

3. The cache subsystem as recited in claim 1, wherein each of the plurality of identifiers correspond to a pending cache access being identified by the execution core as an oldest pending cache access.

4. The cache subsystem as recited in claim 1, wherein the cache controller is configured to;
  monitor a second amount of time that the execution core spends waiting on instructions to access the second cache portion;
  determine the condition is the first amount of time being less than the second amount of time; and
  apply the second policy to the third cache portion, responsive to the condition is not satisfied.

5. The cache subsystem as recited in claim 4, wherein responsive to the first amount of time for the first cache portion being less than the second amount of time for the second cache portion, the cache controller is configured to:
  create a third policy;
  apply the third policy to the second cache portion while applying the first policy to the first cache portion; and
  apply the third policy to the third cache portion responsive to a third amount of time for the second cache portion being less than a fourth amount of time for the first cache portion.

6. The cache subsystem as recited in claim 1, wherein the cache controller comprises a plurality of counters, each configured to indicate a number of cycles that requests corresponding to a portion of the cache spend waiting for a response.

7. The cache subsystem as recited in claim 1, wherein the first amount of time is equal to an average number of clock cycles that the execution core spends waiting for an access to the first cache portion.

8. A method comprising:
  receiving, by a cache controller from an execution core, a plurality of identifiers corresponding to pending cache accesses that are relatively old compared to other pending cache accesses;
  splitting, by the cache controller, the plurality of identifiers into a first bucket of identifiers and a second bucket of identifiers;
  applying, by the cache controller, a first policy to the first bucket of identifiers and a second policy different from the first policy to the second bucket of identifiers;
  partitioning, by the cache controller, the cache into a first cache portion corresponding to the first bucket of identifiers and a second cache portion corresponding to the second bucket of identifiers;
  monitoring, by the cache controller, a first amount of time that the execution core spends waiting on instructions to access the first cache portion; and
  applying the first policy to a third cache portion of the cache, responsive to a condition is satisfied.

9. The method as recited in claim 8, wherein the first policy specifies one or more of cache line replacement policy, cache line insertion policy, request priority, speculation hint generation, and pre-emptive response generation for the first cache portion.

10. The method as recited in claim 8, wherein each of the plurality of identifiers correspond to a pending cache access being identified as an oldest pending cache access.

11. The method as recited in claim 8, further comprising:
  monitoring, by the cache controller, a second amount of time that the execution core spends waiting on instructions to access the second cache portion;
  determining, by the cache controller, the condition is the first amount of time being less than the second amount of time; and
  applying, by the cache controller, the second policy to the third cache portion, responsive to the condition is not satisfied.

12. The method as recited in claim 11, wherein responsive to the first amount of time for the first cache portion being less than the second amount of time for the second cache portion, the method further comprising:
  creating a third policy;
  applying the third policy to the second cache portion while applying the first policy to the first cache portion; and
  applying the third policy to the third cache portion responsive to a third amount of time for the second cache portion being less than a fourth amount of time for the first cache portion.

13. The method as recited in claim 12, wherein one or more attributes of the third policy are randomly generated.

14. The method as recited in claim 8, wherein the first amount of time is equal to an average number of clock cycles that the execution core spends waiting for an access to the first cache portion.

15. A system comprising:
  a memory; and
  a processor coupled to the memory comprising:
    an execution core;
    a cache; and
    a cache controller; and
  wherein the cache controller of the processor is configured to:
    receive, from the execution core, a plurality of identifiers corresponding to pending cache accesses that are relatively old compared to other pending cache accesses;
    split the plurality of identifiers into a first bucket of identifiers and a second bucket of identifiers;
    apply a first policy to the first bucket of identifiers and apply a second policy different from the first policy to the second bucket of identifiers;
    partition the cache into a first cache portion corresponding to the first bucket of identifiers and a second cache portion corresponding to the second bucket of identifiers;
    monitor a first amount of time that the execution core of the processor spends waiting on instructions to access the first cache portion; and
    apply the first policy to a third cache portion of the cache, responsive to a condition is satisfied.

16. The system as recited in claim 15, wherein the first policy specifies one or more of cache line replacement policy, cache line insertion policy, request priority, speculation hint generation, and pre-emptive response generation for the first cache portion.

17. The system as recited in claim 15, wherein each of the plurality of identifiers correspond to a pending cache access being identified by the execution core as an oldest pending cache access.

18. The system as recited in claim 15, wherein the cache controller is further configured to:
  monitor a second amount of time that the execution core spends waiting on instructions to access the second cache portion;
  determine the condition is the first amount of time being less than the second amount of time; and
  apply the second policy to the third cache portion, responsive to the condition is not satisfied.

19. The system as recited in claim 18, wherein responsive to the first amount of time for the first cache portion being less than the second amount of time for the second cache portion, the processor is further configured to:
  create a third policy;

apply the third policy to the second cache portion while applying the first policy to the first cache portion; and
apply the third policy to the third cache portion responsive to a third amount of time for the second cache portion being less than a fourth amount of time for the first cache portion.

20. The system as recited in claim 19, wherein one or more attributes of the third policy are randomly generated.

\* \* \* \* \*

UNITED STATES PATENT AND TRADEMARK OFFICE
CERTIFICATE OF CORRECTION

PATENT NO. : 11,561,895 B2
APPLICATION NO. : 16/562101
DATED : January 24, 2023
INVENTOR(S) : Paul James Moyer It is certified that error appears in the above-identified patent and that said Letters Patent is hereby corrected as shown below:

In the Claims

Column 9, Claim 4, Line 2, please delete "configured to;" and insert --configured to:--

Signed and Sealed this
Eighteenth Day of July, 2023

Katherine Kelly Vidal
*Director of the United States Patent and Trademark Office*